(12) United States Patent
Brulhart

(10) Patent No.: US 6,712,425 B2
(45) Date of Patent: Mar. 30, 2004

(54) AERODYNAMIC STABILIZER FOR MOTOR VEHICLE

(76) Inventor: Yvan Brulhart, 59, route Suisse, 1295 Mies (CH)

( * ) Notice: Subject to any disclaimer, the term of this patent is extended or adjusted under 35 U.S.C. 154(b) by 0 days.

(21) Appl. No.: 10/240,247

(22) PCT Filed: Feb. 16, 2001

(86) PCT No.: PCT/IB01/00204

§ 371 (c)(1),
(2), (4) Date: Sep. 30, 2002

(87) PCT Pub. No.: WO01/72573

PCT Pub. Date: Oct. 4, 2001

(65) Prior Publication Data

US 2003/0098576 A1 May 29, 2003

(30) Foreign Application Priority Data

Mar. 30, 2000 (EP) ............................................. 00106813
May 10, 2000 (WO) ................................ PCT/IB00/00612

(51) Int. Cl.$^7$ ............................................. B62D 37/02
(52) U.S. Cl. ..................... 296/180.1; 296/185; 296/198
(58) Field of Search .......................... 296/180.1, 180.5, 296/198, 185; 180/903; D12/88; 280/851, 855, 848

(56) References Cited

U.S. PATENT DOCUMENTS

| 1,352,798 | A |   | 9/1920  | Emery                    |
|-----------|---|---|---------|--------------------------|
| 4,262,953 | A | * | 4/1981  | McErlane ........... 296/180.4 |
| 4,334,694 | A | * | 6/1982  | Iwanicki ............. 280/851 |
| 4,883,308 | A |   | 11/1989 | Singer                   |
| 4,982,973 | A | * | 1/1991  | Saito et al. ........ 296/180.1 |
| 5,375,882 | A | * | 12/1994 | Kock, III ........... 296/180.1 |
| 5,419,608 | A | * | 5/1995  | Takemoto ........... 296/180.1 |
| 5,626,185 | A | * | 5/1997  | Gielda et al. ...... 296/180.1 |
| 6,435,298 | B1| * | 8/2002  | Mizuno et al. ..... 296/180.1 |

FOREIGN PATENT DOCUMENTS

| FR | 1 432 646    |   | 6/1966  |                |
|----|--------------|---|---------|----------------|
| FR | 2 165 068    |   | 8/1973  |                |
| GB | 2270658 A    | * | 3/1994  | ....... 296/180.1 |
| JP | 06107245 A   | * | 4/1994  | ....... 296/180.1 |
| JP | 06227436 A   | * | 8/1994  | ....... 296/180.1 |
| NL | 9 400 637    |   | 12/1995 |                |
| WO | 86 04030     |   | 7/1986  |                |

* cited by examiner

*Primary Examiner*—Dennis H. Pedder
*Assistant Examiner*—Gregory Blankenship
(74) *Attorney, Agent, or Firm*—Young & Thompson

(57) ABSTRACT

An aerodynamic stabilizer for motor vehicle includes at least one baffle plate in the vehicle wheel housing.

15 Claims, 4 Drawing Sheets

AERODYNAMIC STABILIZER FOR MOTOR VEHICLE

BACKGROUND OF THE INVENTION

The present invention has for its object an aerodynamic stabilizer for an automotive vehicle.

DESCRIPTION OF THE RELATED ART

There are known such deflectors constituted by spoilers fixed to the lower portion of the radiator grill or to the rear of the body or of the chassis. These spoilers have the effect of aerodynamically pressing the vehicle toward the ground to increase the adherence of the tires to the roadway and hence to improve drivability, steering and holding to the road of the vehicle thus equipped.

These spoilers however have substantial drawbacks, particularly for racing or rally vehicles. They increase the weight of the vehicle, they are difficult to secure to the vehicle to resist forces to which they are subjected and as to front spoilers, they are very vulnerable and damaged by the least shock.

FR 2 165 068, NL 9 400 637 and FR 1 432 646 all disclose devices designed to improve the aerodynamics about the wheels of motor vehicles. These devices are constituted by a baffle disposed, contrary to the spoilers mentioned above, in a space comprised between the wheel and the vehicle body. The devices proposed are however relatively large and have a great size by comparison to the effect they produce and their recess for which they are intended. Moreover, the shape of these devices does not permit optimizing the desired effect.

The present invention has for its object the provision of an aerodynamic stabilizer for an automotive vehicle, which will be light, of small size, easy to fix to the vehicle, not vulnerable to shocks and not cumbersome, which offers little or no air resistance and hence does not slow the vehicle.

The present invention has for its object an aerodynamic stabilizer for an automotive vehicle.

BRIEF DESCRIPTION OF THE DRAWINGS

The drawings show schematically and by way of example several embodiments of the aerodynamic stabilizer according to the invention.

In FIG. 1 is shown the front left portion of an automotive vehicle comprising, mounted on a chassis, the body 1 and the front wheels 2. Each wheel 2 is rotatably mounted and the front wheels are steerable to left or right, in a wheel well 3 which comprises the body 1. This wheel well 3 forms a recess, open on the outer side of the car, within which the wheel can freely turn and be steered. This wheel well is also downwardly open and extends from the lower side 4 of the vehicle to a high point 5 slightly above the tire 6 of the wheel 2.

Figure 1:
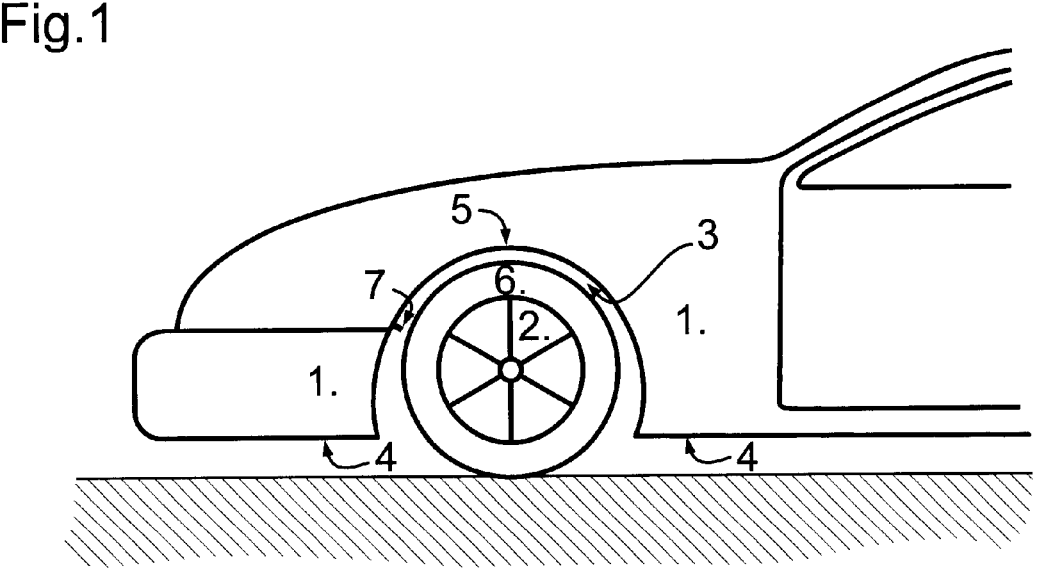
FIG. 1 is a partial side view of a vehicle provided with a first embodiment of aerodynamic stabilizer according to the invention.
Figure 2:
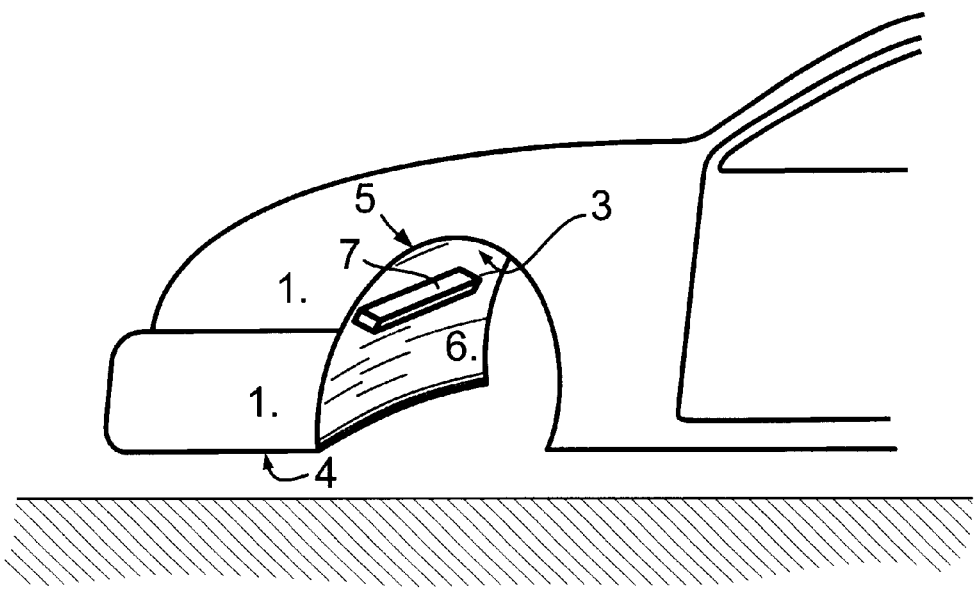
FIG. 2 is a partial perspective view of a wheel well provided with the stabilizer of FIG. 1.

When the vehicle advances, and particularly when the speed of movement is great, there is created a circulation of air about the wheels 2 in the wheel well 3 which tends to decrease the force with which the wheel 2 and the tire 6 bear on the ground, giving rise to well-known drawbacks of loss of adherence, loss of drivability, holding to the road and steerability.

The stabilizer according to the invention, constituted by a baffle 7 mounted in the front portion of the wheel well 3 between the lower part 4 and the high part 5 of the wheel well, preferably on the front portion of this wheel well, permits modifying the air flow in the wheel well and decreasing the lifting or destabilizing effect of this air flow. To the extent the wheel 2 regains its adherence to the ground, so also it gains drivability and steerability. Holding to the road by the vehicle is thus restored.

The baffle 7 is for example formed by a flat iron or bar fixed to the body in the front portion of the wheel well, extending substantially transversely over all or a portion of the width of the wheel well. Preferably, each baffle 7 extends at least over a length corresponding to the width of the tire 6.

Each baffle 7 can be straight or have the form of a broken or wavy line. Its height depends on the position in which it is disposed in the wheel well and on the distance separating the tire and the wheel well at this point.

In modifications, each baffle 7 could be constituted by a latticework or a pierced metal sheet.

In other modifications, the shape and size of the baffle can vary. This baffle can, on its free edge disposed facing the tire, have a curved shape substantially parallel to the outer shape of the tire.

It is evident that several baffles can be provided, disposed along the wall of the wheel well. In this case, these baffles can be disposed one after the other or in a diagonal pattern.

In all the embodiments and modifications, the result of mounting these baffles is always a modification of the air flow circulating in the wheel well, tending to reduce the upward pressure created by this air flow on the vehicle.

The securement of the baffle or baffles can be effected by welding, cementing, by screws or any other suitable means.

Such a stabilizer is low cost, easy to produce and to fix to the vehicle, and offers no resistance to movement of the vehicle and is not visible and is protected from shocks.

The vehicle can be provided with such a stabilizer on the front wheels only, or on the front and rear wheels, or on only the rear wheels.

In the case of cars comprising a molded body, the baffle forming the stabilizer can be an integral portion of that portion of the body forming the wheel well.

In this first embodiment, the baffle or baffles are disposed transversely relative to the car, namely, substantially parallel to the wheel axle.

Figure 3:
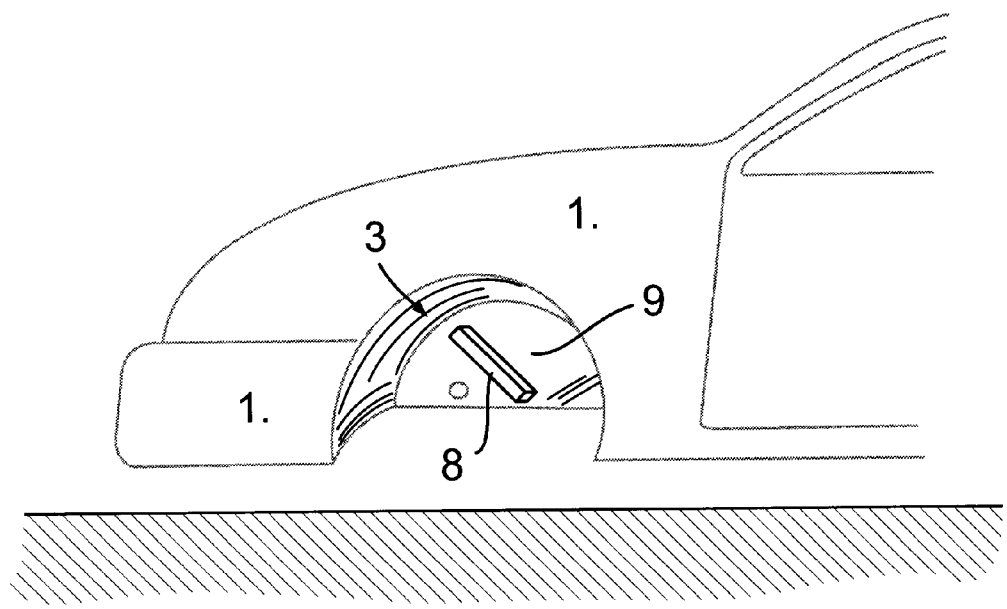
FIG. 3 shows a second embodiment of the stabilizer according to the invention.

FIG. 3 shows a second embodiment of the aerodynamic stabilizer according to the invention. Here again this stabilizer is formed by a baffle 8 or wing but the latter is fixed or made or one piece with the bottom 9 of the wheel well 3.

Thus, this baffle is located in the lateral space between the tire and the bottom 9 of the wheel well. Preferably, this baffle 8 is inclined rearwardly at an angle comprised between 20 and 60° relative to the traveling plane of the vehicle.

The presence of this baffle modifies the turbulence in the wheel well and gives rise to an under pressure between the wheel 6 and the bottom 9 of the wheel well, which promotes cooling of the brakes and moreover improves the stability of the vehicle.

In this second embodiment, the baffle or baffles are located perpendicularly to the wheel axle, namely, substantially in a plane parallel to the longitudinal axis of the car.

Figure 4:
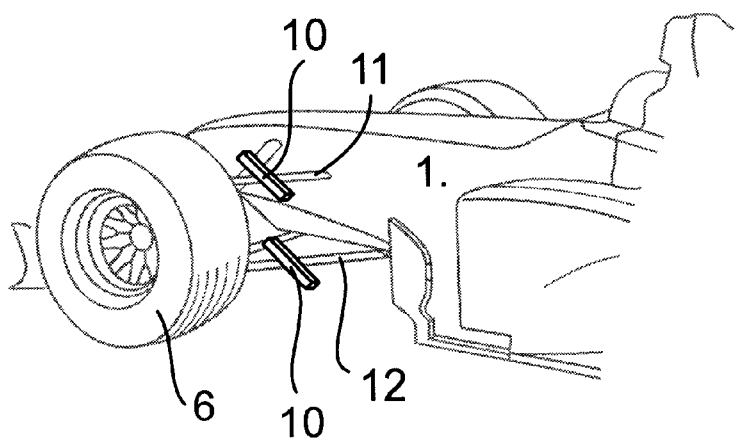
FIG. 4 shows in perspective a third embodiment of the stabilizer according to the invention on an F1.
Figure 5:
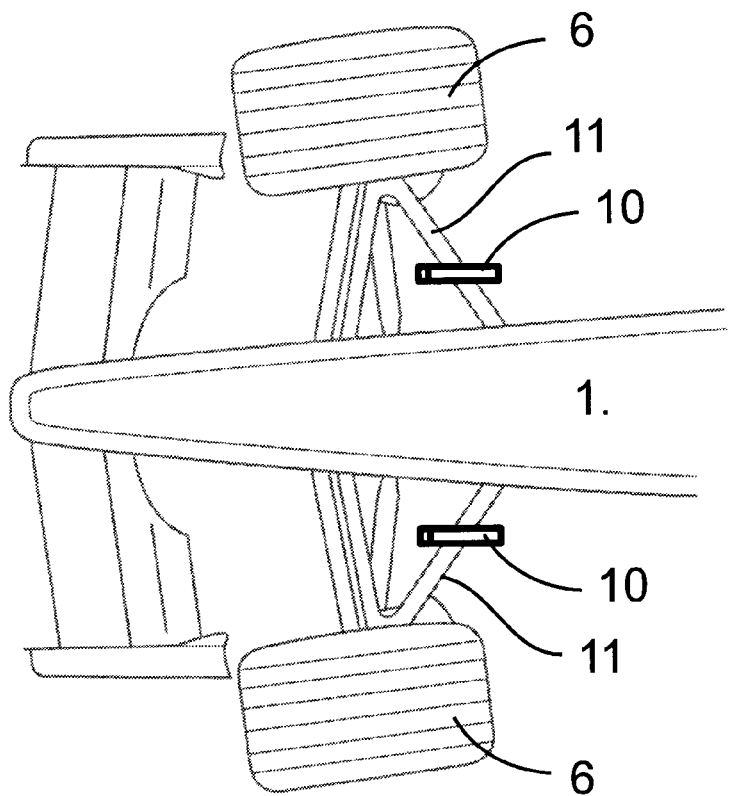
FIG. 5 is a top view of FIG. 4.
Figure 6:
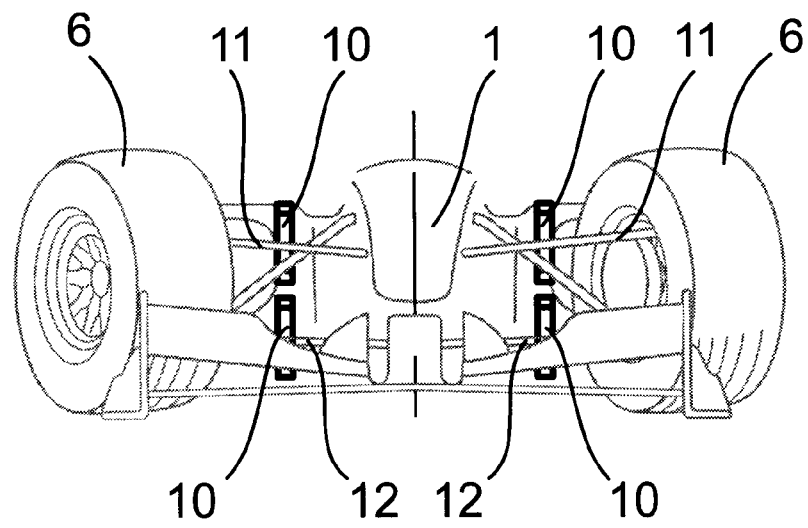
FIG. 6 is a front view of FIG. 4.

The third embodiment of dynamic stabilizer is illustrated in FIGS. 4, 5 and 6 and is adapted to be provided on racing cars and formula 1 cars. These cars have no wheel well properly so called, however it will be noted that the space comprised between the front body portion or nose of the car and the front tires is also the site of turbulence and over-pressure.

This turbulence can be eliminated and there can be created an under pressure between the tires and the body by securing baffles 10 on the support bars 11, 12 of the wheels. These baffles 10 are present in the form of small plates inclined rearwardly at an angle comprised between 0 and 60°, preferably 45° relative to the traveling plane of the vehicle. In the illustrated embodiment, two baffles 10 are fixed one on the upper bar 11 and the other on the lower bar 12, but in modifications, a single baffle can be provided on one of the securement bars 11 or 12. Similarly, in the example shown, the baffles 10 are fixed on the rear arm of the securement arms 11, 12 but they could be fixed on the front arms of the securement bars.

The presence of these baffles 10 facilitates evacuation of the air from the space comprised between the wheel and the body, which stabilizes the wheel which regains its adherence and above all gives rise to an under pressure which sucks the air through the wheel permitting better cooling of the brakes.

Of course, these baffles could also be mounted on the securement bars of the rear wheels.

These baffles preferably extend substantially parallel to the longitudinal axis of the car but they could also be inclined transversely in modified embodiments.

In one modification, the baffles 10, instead of being mounted on the suspension bars of the wheel, could be fixed on or produced of one piece with the wall of the body facing the inner side of the wheel.

In the described embodiments, the baffles are flat; obviously, in modifications, they could be profiled and/or have an aerodynamic shape.

Moreover, the weight and dimensions of the baffles obviously depend on the vehicle on which they are mounted.

Figure 7:
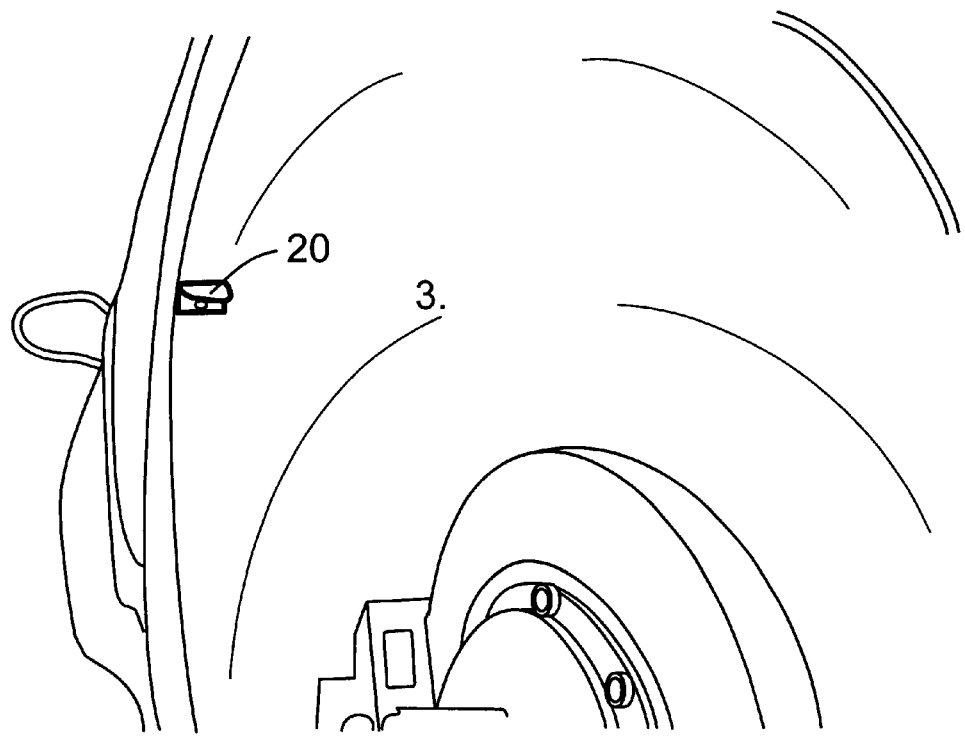
FIG. 7 is a perspective view of the front left wheel well of a vehicle provided with a fourth embodiment of the stabilizer.
Figure 8:
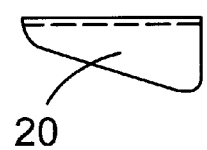
FIG. 8 is a plan view of the stabilizer of FIG. 7.
Figure 9:
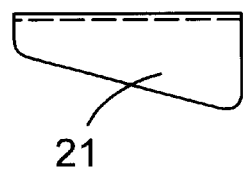
FIG. 9 is a plan view of a stabilizer according to the fourth embodiment but adapted for the rear wheel well of the vehicle.

FIGS. 7 to 9 show a fourth embodiment of the aerodynamic baffle or stabilizer according to the invention.

In this embodiment, the dimensions of the baffle are reduced. The baffles adapted to be provided for the front wheel wells, shown in FIG. 8, have the shape of an angle iron whose rectangular portion is adapted for securement whilst the other wing 20 has the general shape of a right triangle whose two summits are rounded. The length of this baffle is of the order of 20 to 25 mm whilst its width is comprised between 7 to 15 mm.

Each baffle is fixed in the wheel well, as shown in FIG. 7, on a straight line passing through the axis of the wheel and making an angle of about 45° relative to the bottom of the body. Moreover, this baffle is fixed such that its active surface 20 will be substantially perpendicular to the wheel well and that its greatest length will be located inwardly of the wheel well. The positioning of the baffle is such that it is located facing the outer edge of the tire, namely in the outer edge of the wheel well.

The rear baffle on the same car is shown in FIG. 9. Its active surface 21 is slightly larger, 25 to 35 mm in length and 10 to 15 mm in width, but its position in the rear wheel passage is similar to the positioning of the front baffle relative to the wheel well.

Tests have shown that, surprisingly, such small baffles that do not extend over all the width of the tire but only over about 1/10th of its width, have an effectiveness even more marked than baffles of a width substantially equal to that of the tire.

What is claimed is:

1. Aerodynamic stabilizer for a motor vehicle being constituted by at least one baffle disposed in a space comprised between a wheel and a body of the vehicle, characterized by an active surface of the at least one baffle having a shape substantially of a right triangle whose two summits are rounded.

2. Stabilizer according to claim 1, characterized by a baffle is constituted by a flat iron, perforated or not.

3. Stabilizer according to claim 1, characterized by a width of said at least one baffle is substantially equal to 1/10th of a width of a tire on the wheel.

4. Stabilizer according to claim 1, characterized by each wheel well comprises a single baffle of said at least one baffle fixed adjacent an outer edge of the wheel well.

5. Stabilizer according to claim 1, characterized by each baffle is constituted by a flat iron.

6. Stabilizer according to claim 1, characterized by at least one baffle is constituted by a latticework.

7. Stabilizer according to claim 1, characterized by the stabilizer comprises several baffles disposed one following the other.

8. Stabilizer according to claim 7, characterized by the baffles are disposed in a diagonal pattern.

9. Stabilizer according to claim 1, characterized by the at least one baffle comprises several baffles that are positioned in a front portion of a wheel well.

10. Stabilizer according to claim 1, characterized by the baffle is positioned against a bottom of a wheel well beside the wheel.

11. Stabilizer according to claim 1, characterized by the at least one baffle is fixed on at least one securement bar of the wheel connecting the latter to a chassis of the vehicle.

12. Stabilizer according to claim 1, characterized by the at least one baffle is fixed on a wall of the body facing an inner side of the wheel.

13. Stabilizer according to claim 1, characterized by the at least one baffle is inclined rearwardly at an angle comprised between 0 and 60° relative to a rolling plane of the vehicle.

14. Stabilizer according to claim 1, characterized by the at least one baffle extends substantially parallel to an axle of the wheel.

15. Stabilizer according to claim 1, characterized by the baffle extends substantially perpendicular to an axle on the wheel.

* * * * *